United States Patent [19]

Sato et al.

[11] Patent Number: 4,931,524

[45] Date of Patent: Jun. 5, 1990

[54] SURFACE-TREATMENT OF SYNTHETIC OR SEMI-SYNTHETIC FIBER TEXTILE MATERIALS

[75] Inventors: Kazuo Sato; Masahiro Komori, both of Kyoto, Japan

[73] Assignee: Dai-Ichi Kogyo Seiyaku Co., Ltd., Kyoto, Japan

[21] Appl. No.: 15,196

[22] Filed: Feb. 17, 1987

[51] Int. Cl.[5] .................... C08G 18/00; C08G 18/10; C08G 18/70; C08G 18/81
[52] U.S. Cl. .................... 527/301; 527/302; 528/45; 528/59; 528/67
[58] Field of Search .................... 527/300, 301, 302; 536/1.1, 18.7; 528/45, 59, 67

[56] References Cited

U.S. PATENT DOCUMENTS

| | | | |
|---|---|---|---|
| 4,174,309 | 11/1979 | Stournas | 527/302 |
| 4,404,347 | 9/1983 | Nakamura et al. | 527/301 |
| 4,629,774 | 12/1986 | Sato et al. | 527/302 |
| 4,634,743 | 1/1987 | Prier | 528/370 |
| 4,659,795 | 4/1987 | Tsutsui et al. | 526/301 |

*Primary Examiner*—Nathan M. Nutter
*Attorney, Agent, or Firm*—Millen, White & Zelano

[57] ABSTRACT

Synthetic or semi-synthetic fiber textile materials are coated with an aqueous solution or dispersion of a thermally reactive saccharide-urethane composition. The saccharide/urethane composition consists of a saccharide/polyisocyanate adduct having at least one blocked isocyanate group, a saccharide/urethane ether having at least one blocked isocyanate group, or mixture of a saccharide material and a thermally reactive crosslinker thereof.

14 Claims, No Drawings

SURFACE-TREATMENT OF SYNTHETIC OR SEMI-SYNTHETIC FIBER TEXTILE MATERIALS

BACKGROUND OF THE INVENTION

This invention relates to a composition and a methods for treating synthetic or semi-synthetic fiber textile materials such as yarns, fabrics and the like for modifying their surface properties.

Synthetic and semi-synthetic fibers such as polyester, polyamide, acrylic, polyolefin, and cellulose acetate fibers have become widespread over various natural fibers including cotton, wool and silk in their production and consumption. However, there still exists a need for improving certain properties. They have relatively inert and dense surface and internal texture and exhibit poor dyeability, hygroscopicity, adhesiveness and the like. An enormous amount of attempts has been made and known in literatures to improve these properties but most of them have been proven unsatisfactory in commercial practice.

For example, polyester and polyamide fibers may be imparted with water-absorptive properties by post-treating with polyoxyethylene compounds, but this treatment has certain disadvantages including decrease in color fastness particularly frictional color fastness of the resulting products when dyeing with disperse dyes. In addition, this treatment is not effective to give the fibers with substantial moisture-adsorptive properties.

Since polyester fibers have a dense texture and consit of a chemically inert polymer material, they are not dyeable with conventional anionic and reactive dyes. They may be dyed only with disperse dyes requiring a temperature as high as 130° C. or higher. It is known to improve the dyeability of polyester fibers by copolymerizing the polymer material with an anionic group-containing dibasic acid component or polyoxyethylene based glycol component in order to enable the use of cationic dyes or boiling dyeing methods. However, these approaches must suffer from certain disadvantages such as the use of relatively expensive raw materials and decrease in strength and other physical properties. The dyeing conditions of these modified fibers still require a temperature as high as 100°-120° C.

Chemically inert surfaces and dense texture of synthetic fibers such as polyester and polyolefin fibers also present a problem of poor adhesive strength to rubber or other elastomers when used as a reinforcement of pneumatic tires, conveyer belts, synthetic leather and the like. For example, tire cord is conventionally treated with resorcinol-formaldehyde-latex (RFL) prior to embedding into rubber. Since synthetic fibers generally exhibit a poor affinity to RFL, various pre-treating methods have been proposed but none of them has been proven completely satisfactory.

In the U.S. patent application Ser. No. 771,758, filed Sept. 3, 1985 and assigned to the assignee of this application (now U.S. Pat. No. 4,629,774), we have disclosed a composition for surface-treating synthetic fiber fabrics comprising an aqueous solution or dispersion of a thermally reactive polyisocyanate-adduct of hydroxyalkylated polysaccharide having at least one blocked isocyanate group. We have now discovered that similar products may be obtained starting from intact polysaccharides and their derivatives other than hydroxyalkyl ethers and/or using various reactants other than those described in said application.

SUMMARY OF THE INVENTION

It is an object of the present invention to provide a composition and method for chemically modifying the surfaces of synthetic and semi-synthetic fibers to improve their properties such as hygroscopicity, dyeability, affinity to other materials, fusion resistance and the like without compromising their normal properties.

It is another object of the present invention to provide a composition and method for imparting synthetic and semi-synthetic fibers with water-absorptive, moisture-absorptive and water-retentive properties without compromising color fastness.

It is a further object of the present invention to provide a composition and method for surface-treating synthetic fibers, particularly polyester fibers in order that the fiber products may be dyed with conventional reactive dyes at a temperature below 100° C.

It is a still further object of the present invention to provide a composition and method for surface-treating synthetic and semi-synthetic fibers to improve adhesive properties to other materials and resistance to fusion or friction.

Other objects and advantages of the present invention will become apparent as the description proceeds.

According to the first aspect of the present invention, there is provided a composition for use in surface-treating synthetic or semisynthetic fiber textile materials comprising an aqueous solution or dispersion of a thermally reactive polyisocyanate-adduct of an oligo- or polysaccharide, a lower alkyl ether thereof, a lower alkyl/hydroxy-lower alkyl ether thereof, or an ionizable group-substituted lower alkyl ether thereof, said adduct having at least one blocked isocyanate group capable of regenerating free isocyanate function upon heating.

In the second aspect of the present invention, there is provided a composition for use in surface-treating synthetic or semi-synthetic fiber textile materials comprising an aqueous solution or dispersion of a thermally reactive polyisocyanate adduct of polysaccharide hydroxy-lower alkyl ether, said adduct having at least one blocked isocyanate group capable of regenerating free isocyanate function upon heating and a nonionic, cationic or ampho-ionic hydrophilic moiety.

In another aspect of the present invention, there is provided a composition for use in surface-treating synthetic or semi-synthetic fiber textile materials comprising an aqueous solution or dispersion of a thermally reactive oligo- or polysaccharide/urethane ether having at least one blocked isocyanate group capable of regenerating free isocyanate function upon heating.

In a further aspect of the present invention, there is provided a composition for use in surface-treating synthetic or semi-synthetic fiber textile materials comprising an aqueous solution or dispersion of a mixture of (a) a water-soluble mono-, oligo-, polysaccharide or a water soluble derivative thereof, and (b) a bloocked polyisocyanate compound, a polyurethane having a plurality of terminal epoxide groups, or a polyurea having a plurality of terminal ethyleneureido groups.

In a method aspect of the present invention, there is provided a method for surface-treating synthetic or semi-synthetic fiber textile materials comprising the steps of applying the composition of this invention to said materials and then heat-treating the materials at an elevated temperature from 100° C. to 240° C.

DETAILED DISCUSSION
BLOCKED POLYISOCYANATE/SACCHARIDE ADDUCT

Examples of intact oligo- and polysaccharides include cellulose, starch, dextrin, tamarind gum, chitosan, guar gum, maltose, trehalose, gentiobiose, sucrose and cyclodextrin.

Lower alkyl ethers, lower alkyl/hydroxy-lower alkyl ethers and ionizable group-substituted lower alkyl ethers of these oligo- and polysaccharides may also be used. Examples of these modified saccharides include methylcellulose, hydroxyethyl methylcellulose, hydroxypropyl methylcellulose, hydroxybutyl methylcellulose, carboxymethylcellulose, sulfoethylcellulose and cationic cellulose derivatives such as those produced by reacting alkali cellulose with N-(3-chloro-2-hydroxypropyl)-N,N,N-trimethylammoniumchloride or N-(2,3-epoxypropyl)-N,N,N-trimethylammonium chloride. Corresponding derivatives of other oligo- and polysaccharides may also be used.

These intact or modified oligo- or polysaccharides may be converted into the desired blocked polyisocyanate adducts by reacting with an excess of polyisocyanate compound to form a precursor having at least one free isocyanate group, and then blocking the free isocyanate group with a blocking agent. Alternatively, said blocked polyisocyanate adduct may be obtained by directly reacting a partially blocked polyisocyanate compound with the saccharide component.

Usable polyisocyanate compounds includes various organic polyisocyanates and urethane prepolymers having at least two free isocyanate groups per molecule.

Non-limiting examples of polyisocyanates include aromatic diisocyanates such as tolylenediisocyanate, and diphenylmethanediisocyanate; cycloaliphatic diisocyanates such as isophorondiisocyanate; aliphatic diisocyanates such as hexamethylenediisocyanate; and araliphatic diisocyanates such as xylylenediisocyanate.

Urethane prepolymers having at least two free isocyanate groups per molecule may be prepared, as is well-known, by reacting an excess of organic polyisocyanate with a polyhydroxyl compound such as 1,6-hexanediol, trimethylolpropane, polybutadiene glycol, polyether polyols and polyester polyols. Also included within usable polyol components are adducts of an alkylene oxide with an tertiary amine such as triethanolamine or N-methyldiethanolamine, quaternary ammonium group-containing polyols produced by quaternizing the above adducts, silicone polyols and fluorine-containing polyols.

The above oligo- or polysaccharide component and the polyisocyanate component may be reacted at an NCO/OH ratio greater than 1.0, preferably greater than 2.0. The reaction is preferably carried out in a hydrophilic inert organic solvent to obtain a low-viscosity, uniform reaction product in the form of a solution. Examples of preferred solvents include dioxane, methyl ethyl ketone, dimethylformamide, dimethylsulfoxide, N-methylpyrolidone and pyridine.

The resulting precursor has a plurality of free isocyanate groups and thus is liable to gelling upon the reaction itself or with water and other active hydrogen-containing compounds. It is for this reason that the free isocyanate function is blocked with a blocking agent to give a thermally reactive, blocked isocyanate group-containing saccharide urethane. Examples of suitable blocking agents include secondary or tertiary alcohols such as isopropanol and tert.-butanol; active methylene compounds such as dialkyl malonate, acetylacetone and alkyl acetoacetate; phenols and halophenols such as phenol, chlorophenol, cresol, p-tert.-butylphenol and p-nonylphenol; oximes such as methyl ethyl ketoxime and cyclohexanone oxime; lactams such as ε-caprolactam; imidazole compounds; and alkali metal bisulfite such as sodium bisulfite.

All of the isocyanate groups present in the precursor may be blocked with a water-soluble alkali metal bisulfite or a water-insoluble blocking agent other than the bisulfite. It is also possible to block a part of free isocyanate groups with the water-soluble bisulfite blocking agent, followed by blocking the remaining free isocyanate function with the water-insoluble blocking agent. As a further alternative embodiment, after blocking a part of free isocyanate groups with the water-insoluble blocking agent, the remaining free isocyanate function may be permanently blocked with a compound capable of rendering the product water-soluble or water-dispersible. Examples of such compounds include polyoxyethylene monoethers such as the methyl, ethyl, isopropyl, phenyl or nonylphenyl ether; polyoxyethylene monoesters such as the acetate or stearate; a compound having at least one active hydrogen-donating group and a cationic group such as a quarternary ammonium salt produced by reacting N,N-dimethylaminoethanol with diethyl sulfate or alkyl halide; and a compound having at least one active hydrogen-donating group and an anionic group such as amino sulfonates or amino carboxylates including lithium, sodium, potassium or ammonium salt of taurine, N-methyltaurine, N-butyltaurine, sulfanilic acid, glycine or alanine.

The blocking reaction may be carried out at a temperature from room temperature to 100° C., preferably from 30° C. to 90° C., optionally in a hydrophilic solvent such as dioxane, methyl ethyl ketone, dimethylformamide, methanol, ethanol and isopropanol in the presence of a catalyst such as triethylamine, alkali metal alkoxides or dibutyltin dilaurate.

Water-soluble or water-dispersible, blocked polyisocyanate/saccharide adducts may also be prepared by using a polyol having a hydrophilic polyoxyethylene chain or an ionizable group as a polyol component of the starting urethane polypolymer having a plurality of free isocyanate groups. Examples of such hydrophilic polyols are polyoxyethylene polyols, quarternized N-methyldiethanolamine and dimethylolpropionic acid.

When the starting saccharide component has a nonionic nature, the urethane prepolymer and/or isocyanate modifying agent may have any ionic nature. However, when the starting saccharide component is of cationic or anionic nature, the urethane prepolymer and/or isocyanate modifying agent, as a rule, must have the same ionic nature as the saccharide component. The blocked polyisocyanate/saccaride adduct having an ampho-ionic nature may also be produced by quarternizing a corresponding adduct having a tertiary amino group in the urethane prepolymer moiety with sodium monochloroacetate.

When the starting saccharide component is not water-soluble, it is necessary to introduced a hydrophilic group or segment into the final product by using one of the above methods in order that the final product is water-soluble or water-dispersible.

If the blocking reaction can be carried out in a nonaqueous system, it is possible to block a part of free isocyanate groups of the starting polyisocyanate compound followed by reacting the resulting partially blocked polyisocyanate compound with the starting saccharide component.

ADDUCTS OF BLOCKED POLYISOCYANATE/POLYSACCHARIDE HYDROXYALKYL ETHER

The hereinbefore-discussed techniques generally apply to the production of a thermally reactive polyisocyanate/polysaccharide hydroxy-lower alkyl ether having at least one blocked isocyanate group and a nonionic, cationic or ampho-ionic hydrophilic moiety except those otherwise specified below.

Examples of polysaccharides include starch, dextrin, tamarind gum, guar gum, cellulose and chitosan.

Hydroxyalkylated polysaccharides may be prepared by reacting natural polysaccharides with an alkylene oxide such as ethylene oxide, propylene oxide or butylene oxide. Examples of the resulting adducts include hydroxyethylcellulose, hydroxypropylcellulose or hydroxybutylcellulose having different degrees of substitution. Corresponding hydroxyalkyl ethers of other natural polysaccharides may also be used. Also included are polysaccharide polyoxyalkylene ethers in which more than one oxyalkylene unit are recurring.

The feature of polyisocyanate/polysaccharide hydroxyalkyl ether adducts of this class resides in the presence of at least one hydrophilic moiety or segment having a nonionic, cationic or ampho-ionic nature. This may be achieved by the use of a non-ionizable blocking agent for blocking the free isocyanate function in combination of the introduction of a nonionic, cationic or ampho-ionic moiety into the polyol component of the starting urethane prepolymer.

To this end, hydrophilic polyol components such as polyoxyethylene polyols or quarternized N-methyldiethanolamine may be reacted with an excess of polyisocyanate to produce the starting urethane prepolymer having a hydrophilic moiety. Blocked polyisocyanate adducts having a tertiary amino group in the urethane prepolymer component may be reacted with sodium monochloroacetate to give a corresponding adduct having an ampho-ionic moiety.

Alternatively or in addition to the above, a part of free isocyanate groups present in the precursor polyisocyanate/polysaccharide ether adduct may be blocked with a non-ionizable blocking agent and the remaining free isocyanate function may be reacted with a polyoxyethylene monoether or monoester, or a quarternary ammonium salt produced by reacting N,N-dimethylaminoethanol with a quarternizing agent.

SACCHARIDE/URETHANE ETHERS

The above-described intact oligo- and polysaccharides such as starch, dextrin, tamarind gum, guar gum, cellulose, chitosan, maltose, trehalose, gentiobiose and sucrose, and derivatives thereof such as lower alkyl ethers, hydroxy-lower alkyl ethers, lower alkyl/hydroxy-lower alkyl ethers and ionizable group-substituted lower alkyl ethers, may be etherified with a blocked isocyanate group-containing etherifying agent to give a water-soluble or water-dispersible saccharide/urethane ether for use in surface-treating synthetic or semi-synthetic fiber textile materials.

The blocked isocyanate-containing etherifying agent may be prepared by reacting a polyisocyanate compound having a plurality of free isocyanate groups as discussed hereinbefore with a blocking agent capable of regenerating free isocyanate function to form a partially blocked polyisocyanate compound having at least one remaining free isocyanate group, and then reacting the resulting reaction product with a lower alkylene halohydrin or an adduct of epihalohydrin and a lower alkylene oxide.

The resulting etherifying agent may be hydrophobic or hydrophilic depending upon the nature of the blocking agent or reactant to be reacted with the free isocyanate function and of the polyol component of the starting urethane prepolymer.

For use in the preparation of hydrophobic etherifying agents, non-ionizable blocking agents such as secondary or tertiary alcohols, active methylene compounds, phenols, halophenols, oximes, lactams and imidazole compounds are used in an amount about one equivalent less than the stochiometric amount relative to the free isocyanate content of the starting polyisocyanate compound.

The blocking reaction may be carried out at a temperature from room temperature to 100° C. optionally in the presence of a catalyst such as triethylamine, alkali metal alkoxides or dibutyltin dilaurate. The reaction is preferably carried out in an inert, hydrophilic solvent such as dioxane, methyl ethyl ketone, dimethylformamide and dimethylsulfoxide.

The resulting partially blocked polyisocyanate compound is then reacted with an lower alkylene halohydrin such as ethylene chlorohydrin, ethylene bromohydrin, propylene chlorohydrin, propylene dichlorohydrin, or an adduct of epihalohydrin such as epichlorohydrin and epibromohydrin with a lower alkylene oxide such as ethylene oxide and propylene oxide.

The above reaction sequence may be performed in reverse order from that described just above.

Hydrophilic etherifying agents may be prepared in several ways. First, after reacting the alkylene halohydrin or epihalohydrin/alkylene oxide adduct with a part of isocyanate groups, present in the starting polyisocyanate compound, the remaining isocyanate function is blocked with an alkali metal bisulfite such as sodium bisulfite.

Alternatively, after a non-ionizable blocking agent and an alkylene halohydrin or epihalohydrin/alkylene oxide adduct have been reacted, with the starting polyisocyanate compound to form a haloalkyl urethane having at least one free isocyanate group, the remaining isocyanate function may be blocked with the bisulfite blocking agent or reacted with a compound having at least one active hydrogen-donating group and an anionic, cationic or nonionic hydrophilic moiety.

Examples of the active hydrogen-donating compounds having a anionic moiety include lithium, sodium potassium, ammonium or triethylamine salt of taurine, and corresponding salts of amino carboxylic acids. The reaction with these salts as well as the bisulfite blocking agent may be carried out in an aqueous system at a temperature from room temperature to 50° C.

Examples of the active hydrogen-donating compounds having a cationic moiety include a quaternary ammonium salt produced by reacting dimethyl- or diethylaminoethanol with diethyl sulfate or methyl chloride.

Examples of the active hydrogen-donating compounds having a nonionic, hydrophilic moiety include polyoxyethylene monoethers such as the methyl, ethyl, isopropyl, phenyl or nonylphenyl ether; and polyoxyethylene monoesters such as the acetate or stearate.

The reaction with the active hydrogen donating compounds having a cationic or nonionic hydrophilic moiety is carried out in a non-aqueous system preferably in an inert hydrophilic solvent as previously discussed.

Hydrophilic etherifying agents may also be prepared by using a hydrophilic polyoxyethylene polyol or a polyol having an anionic or cationic group such as dimethylolpropionic acid, quaternized N-methyldiethanolamine and quaternized triethanolamine as a polyol component of the starting urethane prepolymer. The resulting urethane prepolymer is then reacted with a blocking agent to partially block the isocyanate function followed by reacting with an alkylene halohydrin or epihalohydrin/alkylene oxide adduct. When dimethylolpropionic acid is used as a polyol component of the starting urethane prepolymer, the carboxylic function of the etherifying agent is neutralized with a base such as triethylamine, ammonia, sodium hydroxide, potassium hydroxide and lithium hydroxide.

The blocked isocyanate-containing etherifying agent thus prepared is then reacted with oligo- or polysaccharides or their derivatives.

This etherifying reaction may be performed by mixing the starting saccharide component with an aqueous solution of an alkali metal hydroxide such as sodium hydroxide or potassium hydroxide, or tertiary amine such as triethylamine. The amount of the base used for this purpose preferably ranges from 1.0 to 1.3 times in moles relative to the moles of the blocked isocyanate-containing etherifying agent. Before treating with the base, the saccharide starting material is preferably dissolved or suspended in water or a mixture of water and a water-miscible organic solvent such as dioxane, dimethyl sulfoxide, dimethylformamide, ethanol, isopropanol, methyl ethyl ketone and cellosolve acetate. The amount of this liquid medium preferably ranges from 1 to 20 times as the weight of the saccharide starting material. This treatment may be carried out at a temperature from room temperature to 40° C. for 10 to 120 minutes. This step is optional but preferable to accelerate the etherifying reaction in the next step.

The etherifying reaction is carried out by reacting the saccharide starting material and the etherifying agent at a temperature from room temperature to 80° C. Lower temperatures within this range are preferable to avoid hydrolysis of the etherifying agent. The reaction may be carried out in the presence of water since the isocyanate function has been blocked.

For etherifying water-insoluble saccharide starting materials, it is necessary to use a hydrophilic etherifying agent, while water-soluble or water-dispersible saccharide starting materials may be reacted with either hydrophobic or hydrophilic etherifying agent. However, when a oligo- or polysaccharide derivative having anionic or cationic nature is used, the etherifying agent must be, of nonionic or the same ionic nature as the saccharide starting material unless either one of anions or cations are present in large excess.

The composition containing a water-soluble or water-dispersible, thermally reactive oligo- or polysaccharide/urethane ether having a blocked isocyanate group of the present invention may be prepared by neutralizing the resulting reaction mixture with an acid such as phosphoric, nitric, hydrochloric, acetic or oxalic acid and then diluting with water to a suitable concentration.

MIXTURES OF WATER-SOLUBLE SACCHARIDE MATERIALS AND CROSSLINKERS

Hygroscopic coatings may be formed on synthetic or semi-synthetic fibers in situ using a mixture of a water-soluble saccharide material and a urethane based crosslinker.

Examples of water-soluble saccharides which may be used as such for this purpose include sucrose, trehalose, gentiobiose, maltose, starch, dextrin, guar gum and chitosan. Also included are water-soluble polysaccharide derivatives such as methylcellulose, carboxymethylcellulose, sulfoethylcellulose, hydroxyethylcellulose, hydroxypropylcellulose, hydroxybutylcellulose, hydroxyethyl methylcellulose, hydroxypropyl methylcellulose, cationic cellulose derivatives prodced by reacting alkali cellulose with N-(3-chloro-2-hydroxypropyl)-N,N,N-trimethylammonium chloride or N-(2,3-epoxypropyl)-N,N,N-trimethylammonium chloride, and corresponding derivatives of starch.

Crosslinkers are derived again from organic polyisocyanates or urethane prepolymers having a plurality of free isocyanate groups referred to as "polyisocyanate compound" hereinbefore.

Crosslinkers having a blocked isocyanate group capable of regenerating free isocyanate function may be prepared by blocking all of the free isocyanate groups possessed by the starting polyisocyanate compound with a blocking agent such as secondary or tertiary alcohols, active methylene compounds. phenols. halophenols, oximes, lactams, imidazoles and alkali metal bisulfites.

Water-soluble or water-dispersible crosslinkers may be prepared by using an alkalimetal bisulfite such as sodium bisulfite for blocking at least a part of free isocyanate groups. Alternatively, after a part of free isocyanate groups has been blocked with a blocking agent other than the bisulfite blocking agent, the resulting partially blocked polyisocyanate compound may be reacted with a compound having at least one active hydrogen-donating group and an anionic, cationic or nonionic hydrophilic moiety such as water soluble salts of aminoethanesulfonic acid, water-soluble salts of various amino carboxylic acids, quaternized dimethyl- or diethylaminoethanol, and polyoxyethylene ethers and esters as discussed supra. Hydrophilic crosslinkers may also be prepared by using a hydrophilic polyoxyethylene polyol or a polyol having an anionic or cationic group such as dimethylpropionic acid, quaternized N-methyldiethanolamine and quaternized triethanolamine as a polyol component of the starting urethane prepolymer.

Polyurethane crosslinkers having a plurality of terminal epoxide groups may be prepared by reacting a polyisocyanate starting material with a stoichiometric amount of an epoxide compound having at least one active hydrogen-donating group such as glycidol, ethylene glycol monoglycidyl ether, trimethylolpropane diglycidyl ether, and pentaerythritol mono-, di- or triglycidyl ether. Water-soluble crosslinkers of this type may be prepared by using a urethane prepolymer produced from a hydrophilic polyol component.

Polyurea crosslinkers having a plurality of terminal ethyleneureido groups may be prepared by reacting a polyisocyanate starting material with a stoichiometric amount of ethyleneimine. Water soluble crosslinkers of this type may be prepared similarly by using a urethane prepolymer produced from a hydrophilic polyol component.

The water-soluble saccharide materials and the crosslinkers are disolved or dispersed in an aqueous medium at a weight ratio from 50/50 to 90/10, preferably from 50/50 to 80/20. When the crosslinkers are not soluble in water, conventional anionic, cationic or nonionic surfactants may be used to make an emulsion or dispersion.

SURFACE TREATMENT OR SYNTHETIC OR SEMI-SYNTHETIC FIBERS

The saccharide/urethane compositions of the present invention are stable in an aqueous solution or dispersion for a long period of time upon storage. The solution or dispersion may be used for surface-treating various textile materials made of synthetic and semi-synthetic fibers such as polyester, polyamide, acrylic, polyolefine and cellulose acetate fibers in the form of yarns, threads, cord, fabrics and the like.

To this end, such textile materials are impregnated or coated with an aqueous solution or dispersion of the saccharide/urethane composition of the present invention to a pickup amount of greater than 0.1% by weight of fibers on dry basis and then heated at an elevated temperature from 100° C. to 240° C. to form a cured coating on the fiber surfaces. The solution or dispersion may, of course, contain various auxiliary agents such as softening agents, anti-static agents, penetrating agents, catalysts and the like.

The composition according to the present invention may afford a number of advantages. It provides the fibers with water-absorptive, moisture-absorptive and water-retentive properties owing to the presence of saccharide molecules. Unlike prior art compositions, it does not compromise color fastness, particularly frictional color fastness when applied to dyed products. The composition also provides the fibers with improved dyeability and adhesive properties to other materials. Thus, the treated fibers may be dyed with conventional anionic dyes and reactive dyes. When treating pneumatic tire cord, the composition of this invention may improve the adhesion strength of the cord to rubber. Increased fusion resistance of the treated fibers represents another major advantage of this invention.

The surface-treatment according to the present invention substantially does not have any adverse affect on the normal properties of synthetic or semi-synthetic fibers to be treated, while the treated textile materials may have a cotton-like hand and feeling.

The following examples will illustrate the present invention. All parts and percents therein are by weight unless otherwise indicated.

EXAMPLE 1

100 parts of methylcellulose having a degree of substitution of 1.6 were reacted with 564.4 parts of a urethane prepolymer having an isocyanate group content of 11.3%, produced from polypropylene glycol having an M.W. of 400 and hexamethylenediisocyanate, in 100 parts of dioxane at 90° C. for 90 minutes.

The reaction mixture having an isocyanate group content of 4.70% based on the combined weight of methylcellulose and the urethane prepolymer was diluted with 60 parts of ethanol and cooled to 35° C. To the mixture were added 257.7 parts of 30% aqueous solution of sodium bisulfite. The mixture was stirred at 35°–40° C. for 60 minutes. The product was finally diluted with water to a solid content of 20% to obtain a clear viscous solution.

EXAMPLE 2

To 100 parts of hexamethylenediisocyanate were added dropwise 51.8 parts of methyl ethyl ketoxime at 40° C. for 90 minutes. The mixture was allowed to react at the same temperature for 60 minutes to give a partially blocked diisocyanate liquid having a free isocyanate group content of 24.5%.

This liquid was added dropwise to 100 parts of white dextrin suspended in 500 parts of dimethylformamide at 90° C. for 30 minutes and the mixture allowed to react at the same temperature for 420 minutes until the free isocyanate function disappeared. The product was finally diluted with water to a solid content of 15% to give a clear viscous solution.

EXAMPLE 3

100 parts of methylcellulose used in Example 1 were added to 200 parts of dimethylformamide. The mixture was stirred at 90° C. for 30 minutes. To this were added 30.0 parts of partially blocked hexamethylenediisocyanate liquid produced in Example 2 dropwise at 90° C. for 90 minutes. The mixture was allowed to react at the same temperature for 120 minutes until the free isocyanate function disappeared. The product was finally diluted with water to a solid content of 20% to give a clear viscous solution.

EXAMPLE 4

100 parts of methylcellulose used in Example 1 were reacted with 1062 parts of a urethane prepolymer having an NCO content of 6.0%, produced from polyethylene glycol having an M.W. of 1,000 and hexamethylenediisocyanate, in 150 parts of dioxane at 90° C. for 150 minutes. The reaction mixture having a free NCO content of 2.70% based on the combined weight of methylcellulose and the prepolymer was reacted with 52.0 parts phenol in the presence of 0.2 parts of triethylamine at 80° C. for 120 minutes to give a partially blocked reaction product having a free NCO content of 0.70% based on the combined weight of methylcellulose and the urethane prepolymer. To this were added 81.4 parts of 35% aqueous solution of sodium taurinate. The mixture was stirred at 35°–40° C. for 30 minutes. The product was finally diluted with water to a solid content of 15% to give a clear viscous solution.

EXAMPLE 5

50 parts of hexamethylenediisocyanate were reacted with 40.62 parts of N,N-bis(2-hydroxyethyl)-N-ethyl-N-methylammonium ethylsulfate at 90° C. for 80 minutes to obtain a cationic urethane prepolymer having an NCO content of 13.69%.

This prepolymer was reacted with 12.95 parts of methyl ethyl ketoxime at 60° C. for 120 minutes to give a partially blocked urethane prepolymer having a free NCO content of 6.75% based on the combined weight of hexamethylenediisocyanate and the cationic polyol. 57.9 parts of this prepolymer were then added to 100 parts of hydroxypropyl methylcellulose having a degree of substitution of 0.60 in 300 parts of dimethylformamide at 80° C. for 60 minutes. The mixture was allowed to react at 80° C. until the free isocyanate function disappeared. The product was finally diluted with water to a solid content of 20% to give a clear viscous solution.

EXAMPLE 6

100 parts of cellulose polypropylene glycol ether produced by reacting cellulose with 6 moles per glucose unit of propylene oxide were mixed with 200 parts of dioxane and 6.89 parts of a partially blocked cationic urethane prepolymer having a free NCO content of 5.97% produced by reacting 2 moles of hexamethylenediisocyanate and one mole of N,N-bis(2-hydroxyethyl)-N-ethyl-N-methylammonium ethylsulfate and then blocking one terminal NCO group with phenol. The mixture was then reacted at 90° C. until the free isocyanate function disappeared. The product was finally diluted with water to a solid content of 20% to give a clear viscous solution.

EXAMPLE 7

To 100 parts of cellulose polypropylene glycol ether used in Example 6 were added 200 parts of dioxane and 433 parts of a urethane prepolymer having an NCO content of 11.3% produced from polypropylene glycol having an M.W. of 400 and hexamethylenediisocyanate. The mixture was reacted at 85° C. for 90 minutes to give a urethane having an NCO content of 4.4% based on the combined weight of the cellulose ether and the urethane prepolymer. This reaction product was then reacted with 118 parts of methyl ethyl ketoxime at 60° C. for 120 minutes which resulted in a free NCO content of 0.57% based on the combined weight of the cellulose ether and the urethane prepolymer. To the reaction mixture were added 38.6 parts of an adduct of one mole of phenol and 10 moles of ethylene oxide. The mixture was allowed to react at 90° C. until the free isocyanate function disappeared. The product was finally diluted with water to a solid content of 20% to give a clear viscous solution.

EXAMPLE 8

To 100 parts of starch polypropylene glycol ether produced by reacting starch with 6 moles per amylose unit of propylene oxide were added 15.93 parts of 60% DMF solution of a partially blocked urethane prepolymer, which was produced by reacting one mole of trimethylolpropane and 3 moles of hexamethylenediisocyanate and reacting the resulting adduct with one mole of N,N-dimethyl-N-ethyl-N-2-hydroxyethylammonium ethylsulfate followed by blocking one NCO group with phenol. The mixture was allowed to react at 90° C. until the free isocyanate function disappeared. The product was finally diluted with water to a solid content of 20% to give a clear viscous solution.

EXAMPLE 9

To 100 parts of hexamethylenediisocyanate were added dropwise 52.0 parts of methyl ethyl ketoxime at 45° C. for 60 minutes. Then the mixture was allowed to react at 45° C. for 60 minutes to give a partially blocked diisocyanate having a free NCO content of 24.0% based on the weight of the diisocyanate. To the reaction mixture was added dropwise a solution of 48.3 parts of ethylene chlorohydrin in 80 parts of methyl ethyl ketone at 75° C. for 60 minutes. The mixture was allowed to react at 75° C. for 90 minutes until the free isocyanate function disappeared.

An etherifying agent having a solid content of 71.46% and a chlorine content of 10.63% based on the solid content was obtained.

100 parts of cellulose polypropylene glycol ether produced by reacting cellulose with 6 moles per glucose unit of propylene oxide were dissolved in a mixture of 20 parts of methyl ethyl ketone and 80 parts of water and 4.11 parts of 35% aqueous solution of sodium hydroxide were added to the solution. The mixture was then stirred at 35° C. for 30 minutes. To this were added 15.34 parts of the above etherifying agent. The mixture was then allowed to react at 70° C. for 420 minutes until all of the chlorine content of the etherifying agent was solubilized. An amount of acetic acid was added to neutralize excessive sodium hydroxide in the reaction mixture which was then diluted with water to a solid content of 12% to give a semitransparent viscous solution.

EXAMPLE 10

100 parts of polyoxypropylene polyol having an M.W. of 400 were reacted with 84.5 parts of hexamethylenediisocyanate at 90° C. for 90 minutes to give a urethane prepolymer having an NCO content of 11.35%. The prepolymer was reacted with 23.4 parts of phenol in 50 parts of methyl ethyl ketone in the presence of 0.2 parts of triethylamine at 65° C. for 90 minutes to give a partially blocked urethane prepolymer having a free NCO content of 5.56% based on the prepolymer. Then 24.2 parts of propylene chlorohydrin were reacted with the prepolymer at 75° C. for 200 minutes until the free isocyanate function disappeared. An etherifying agent having a solid content of 82.2% and a chlorine content of 3.92% based on the solid content was obtained.

100 parts of carboxymethylcellulose sodium salt having a degree of substitution of 1.50 were dissolved in 500 parts of water. To the solution were added 4.93 parts of 35% aqueous solution of sodium hydroxide. The mixture was stirred at 35° C. for 30 minutes. To the mixture were added 44.1 parts of the above etherifying agent. The mixture was then allowed to react at 50° C. for 270 minutes until all of the chlorine content of the etherifying agent was solubilized. After neutralizing excessive sodium hydroxide with acetic acid, the product was diluted with water to a solid content of 10% to give a semitransparent viscous solution.

EXAMPLE 11

10 parts of trimethylolpropane were reacted with 37.6 parts of hexamethylenediisocyanate at 80° C. for 60 minutes to give a urethane prepolymer having an NCO content of 19.5%. To this were added 6.4 parts of methyl ethyl ketoxime and 5.9 parts of ethylene chlorohydrin. The mixture was then allowed to react at 85° C. for 120 minutes to give a blocked urethane prepolymer having a free NCO content of 6.3%. To the blocked prepolymer were added 100 parts of methyl ethyl ketone and 34.9 parts of 30% aqueous solution of sodium taurinate. The mixture was stirred at 40° C. for 60 minutes to give a hydrophilic etherifying agent having a solid content of 36.12% and a chlorine content of 3.69% based on the solid content.

100 parts of starch were suspended in a mixture of 200 parts of DMF and 100 parts of water. After adding 4.93 parts of 35% aqueous solution of sodium hydroxide, the suspension was stirred at 35° C. for 30 minutes. To this were added 103.4 parts of the above hydrophilic eterifying agent. The mixture was allowed to react at 45° C. for 700 minutes until all of the chlorine content of the etherifying agent was solubilized. After neutralizing excessive sodium hydroxide with phosphoric acid, the product was diluted with water to a solid content of 10% to give a white dispersion.

EXAMPLE 12

To 100 parts of triethylenediisocyanate were added dropwise 50 parts of methyl ethyl ketoxime at 40° C. for 90 minutes. The mixture was then allowed to react at 40° C. for 60 minutes to give a partially blocked isocyanate having a free NCO content of 23.5%. To the product were added dropwise 45.0 parts of ethylene chlorohydrin dissolved in 80 parts of methyl ethyl ketone at 70° C. for 90 minutes. The mixture was allowed to react at 70° C. for additional 90 minutes until the free isocyanate function disappeared. An etherifying agent having a solid content of 71.0% and a chlorine content of 10.17% based on the solid content was obtained.

100 parts of cellulose polypropylene glycol ether used in Example 9 were dissolved in a mixture of 320 parts of methyl ethyl ketone and 80 parts of water. After adding 4.0 parts of 35% aqueous solution of sodium hydroxide, the solution was stirred at 35° C. for 30 minutes. To this were added 15.40 parts of the above etherifying agent and the mixture was allowed to react at 65° C. for 500 minutes until all of the chlorine content of the etherifying agent was solubilized. After neutralizing excessive sodium hydroxide with acetic acid, the product was diluted to a solid content of 10% to give a viscous solution.

EXAMPLE 13

50 parts of hydroxypropyl cellulose (HPC-L, sold by Nippon Soda Co., Ltd.) were dissolved in 450 parts of water. This solution was thoroughly mixed with 33 parts of a solution of water-soluble blocked urethane prepolymer (produced by reacting glycerine/propylene oxide adduct having an M.W. of 5,000 and hexamethylenediisocyanate to an NCO content of 2.2% and then blocking the free isocyanate function with sodium bisulfite, 15% solid content), 1.0 part of ELASTRON CATALYST-32 (sold by Dai-Ichi Kogyo Seiyaku Co., Ltd.) and 1.0 part of 5% aqueous solution of sodium bicarbonate. A composition having a solid content of 10.27% was obtained.

EXAMPLE 14

50 parts of hydroxypropyl cellulose used in Example 13 were dissolved in 450 parts of water. This solution was thoroughly mixed with 20 parts of a solution of water-soluble blocked urethane prepolymer (produced by reacting polyester polyol derived from adipic acid and diethylene glycol having an M.W. of 1,000 and trimethylolpropane/hexamethylenediisocyanate adduct to an NCO content of 5.0% and then blocking 4.0% of the isocyanate content with phenol followed by adducting sodium taurinate to the remaining isocyanate function, 25% solid content) and 2.0 parts of ELASTRON CATALYST-32. A composition having a solid content of 10.54% was obtained.

EXAMPLE 15

50 parts of hydroxypropyl starch having a degree of substitution of 0.6 were dissolved in 450 parts of water. This solution was thoroughly mixed with 5 parts of a water-soluble epoxidized urethane prepolymer produced by reacting two moles of hexamethylenediisocyanate with one mole of polyethylene glycol having 22 oxyethylene recurring units and then reacting two moles of glycidol. A composition having a solid content of 10.89% was obtained.

EXAMPLE 16

50 parts of hydroxypropyl starch used in Example 15 were dissolved in 450 parts of water.

To 50 parts of 6.0% solution of an adduct of one mole of hexamethylenediisocyanate and two moles of glycidol in dioxane were added 6.0 parts of an anionic surfactant (NOIGEN EA-150, sold by Dai-Ichi Kogyo Seiyaku Co., Ltd.) and 108 parts of water gradually with stirring. After the addition, the mixture was stirred using a homomixer to give an emulsion having a solid content of 25%.

500 parts of the above solution of hydroxypropyl starch and 4 parts of the above emulsion were thoroughly mixed to give a composition having a solid content of 10.12%.

EXAMPLE 17

50 parts of methylcellulose having a degree of substitution of 1.5 were dissolved in 450 parts of water. This solution was thoroughly mixed with 4.0 parts of a water-soluble urethane prepolymer produced by reacting two moles of hexamethylenediisocyanate with one mole of polyethylene glycol having 29 oxyethylene recurring units and then reacting two moles of ethyleneimine. A composition having a solid content of 10.71% was obtained.

EXAMPLE 18

50 parts of white dextrin were dissolved in 450 parts of hot water. This solution was thoroughly mixed with 33 parts of the solution of water-soluble urethane prepolymer used in Example 13, 1.0 parts of ELASTRON CATALYST-32 and 1.0 part of 5% aqueous solution of sodium bicarbonate. A composition having a solid content of 10.27% was obtained.

EXAMPLE 19

The compositions obtained in Examples 1-11 each was diluted to a solid content of 5% (Examples 1-5) or 2% (Examples 6-12) with water containing an amount of ELASTRON CATALYST-32 (sold by Dai-Ichi Kogyo Seiyaku Co., Ltd.) corresponding to 12% by weight of the solid content. Compositions of Examples 13-18 each was simply diluted with water to a solid content of 2%.

A dyed polyester jersey fabric was soaked in a bath of one of the above solutions, expressed to a pickup of 100% using a mangle machine, dried at 100° C. for 3 minutes and heat-treated at 140° C. for one minute in a baking machine.

Each sample was tested for water absorption and water retention properties before and after laundering and color fastness.

Water absorption was evaluated by the method according to JIS 10798.

Water retention was evaluated by the following method. Each sample fabric of 20×20 cm size having known weight $W_1$ was soacked in water at ambient temperature for one hour and dewatered in a household washer for 2 minutes. The weight of dewatered sample $W_2$ was then determined. The water retention was calculated according to the following equation:

$$\text{Water retention (\%)} = \frac{W_1 - W_2}{W_1} \times 100$$

The fabric was tested for water absorption, water retention properties and color fastness as in Example 19. The results are shown in Table I.

TABLE I

| | Example 19 | | | | | | | | | | | | | |
|---|---|---|---|---|---|---|---|---|---|---|---|---|---|---|
| Treating composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 13 | Ex. 14 |
| solid content (%) | 5 | 5 | 5 | 5 | 5 | 2 | 2 | 2 | 2 | 2 | 2 | 2 | 2 |
| Water absorption (mm) | | | | | | | | | | | | | |
| Before laundering | 95 | 100 | 85 | 98 | 120 | 95 | 70 | 86 | 90 | 75 | 70 | 90 | 75 |
| After laundering | 90 | 98 | 80 | 90 | 115 | 85 | 65 | 79 | 85 | 70 | 67 | 85 | 68 |
| Water retention (%) | | | | | | | | | | | | | |
| Before laundering | 45 | 50 | 40 | 48 | 52 | 55 | 40 | 53 | 50 | 47 | 52 | 45 | 50 |
| After laundering | 40 | 47 | 37 | 45 | 49 | 48 | 40 | 45 | 43 | 40 | 48 | 43 | 45 |
| Frictional color fastness (grade) | | | | | | | | | | | | | |
| Dry | 4 | 5-4 | 5-4 | 3-4 | 5 | 5-4 | 5 | 5 | 5-4 | 5 | 5 | 5-4 | 4 |
| Wet | 4 | 5-4 | 5-4 | 3-4 | 5-4 | 5-4 | 5-4 | 5-4 | 5-4 | 5-4 | 5-4 | 4 | 4 |

| | Example 19 | | | | Comparative Ex. 1 | Untreated fabric |
|---|---|---|---|---|---|---|
| Treating composition | Ex. 15 | Ex. 16 | Ex. 17 | Ex. 18 | Commercial modifier | |
| solid content (%) | 2 | 2 | 2 | 2 | 5 | 2 | — |
| Water absorption (mm) | | | | | | | |
| Before laundering | 80 | 81 | 75 | 60 | 100 | 81 | — |
| After laundering | 70 | 73 | 67 | 55 | 80 | 71 | — |
| Water retention (%) | | | | | | | |
| Before laundering | 47 | 35 | 45 | 40 | 30 | 25 | — |
| After laundering | 40 | 30 | 40 | 35 | 25 | 20 | — |
| Frictional color fastness (grade) | | | | | | | |
| Dry | 5 | 4 | 5 | 5 | 2 | 2 | 5 |
| Wet | 5-4 | 4 | 4 | 4 | 2 | 2-3 | 5 |

Laundering was carried out with a washing solution containing 2 g/l of a neutral detergent at a bath ratio of 1:30 at 40° C. for 60 minutes using a household washer. Thereafter the fabric was rinsed with water at 40° C. for 60 minutes, expressed and dried.

Color fastness was evaluated by the method according to JIS 0849.

The results obtained are shown in Table I.

COMPARATIVE EXAMPLE 1

The same fabric as used in Example 19 was soaked in a bath consisting of 5% or 2% of a commercially available modifier consisting of bis-(decaethylene glycol) terephthalate diacrylate, 0.1% ammonium persulfate and the balance of water. The fabric was expressed to a pickup of 100%, treated at 100° C. at an R.H. of 100%, and baked at 140° C. for one minutes.

EXAMPLE 20

The compositions obtained in Examples 1–11 and 13–18 each was cast into a PTFE coated petri dish having an inner diameter of 10 cm in an amount corresponding to 3.0 g of the solid content. For compositions of Examples 1–11, 0.36 g of ELASTRON CATALYST-32 was added.

The cast film was air dried overnight, dried at 60° C. for 3 hours and heated at 140° C. for 10 minutes to obtain a fully cured film.

The moisture absorption of the resulting film was evaluated by exposing the film in an atmosphere having an R.H. of 90% at 25° C. and measuring the percent increase in weight against elapsed time.

The results are shown in Table II.

COMPARATIVE EXAMPLE 2

Example 20 was repeated using a solution of 3.0 g of the commercial modifier used in Comparative Example 1 and 0.15 g of ammonium persulfate in 10 g of water.

The results are shown in Table II.

TABLE II

| | % Increase in weight | | | | | | | | | | | |
|---|---|---|---|---|---|---|---|---|---|---|---|---|
| Treating | Example 20 | | | | | | | | | | | |
| composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 13 |
| Time, hrs. | | | | | | | | | | | | |
| 12 | 8 | 13 | 14 | 7 | 15 | 5 | 6 | 5 | 5 | 6 | 5 | 7 |
| 24 | 20 | 21 | 23 | 19 | 28 | 28 | 19 | 25 | 24 | 20 | 25 | 25 |
| 48 | 35 | 40 | 35 | 35 | 43 | 43 | 28 | 47 | 40 | 33 | 45 | 35 |
| 72 | 35 | 40 | 38 | 45 | 45 | 43 | 33 | 48 | 40 | 34 | 45 | 36 |

| Treating | Example 20 | | | | | Comparative Ex. 2 |
|---|---|---|---|---|---|---|
| composition | Ex. 14 | Ex. 15 | Ex. 16 | Ex. 17 | Ex. 18 | Commercial modifier |
| Time, hrs. | | | | | | |
| 12 | 6 | 6 | 5 | 6 | 5 | 3 |
| 24 | 20 | 20 | 25 | 28 | 20 | 12 |
| 48 | 38 | 33 | 45 | 41 | 35 | 18 |

TABLE II-continued

| | | | | | | |
|---|---|---|---|---|---|---|
| 72 | 38 | 34 | 45 | 42 | 37 | 18 |

EXAMPLE 21

Polyester yarns (75 denier/36 filaments) were coated with solutions prepared in Example 19 using a kiss roller to a deposit amount of 3.0% on dry basis, dried at 100° C. for 3 minutes and heat-treated at 140° C. for one minute.

A knitted fabric was made from the treated yarns using a cylindrical knitting machine and the fabric was tested for water absorptions before and after laundering as in Example 19. The results are shown in Table III.

TABLE III

| Treating composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 13 | Ex. 14 |
|---|---|---|---|---|---|---|---|---|---|---|---|---|---|
| Water absorption (mm) | | | | | | | | | | | | | |
| Before laundering | 75 | 80 | 75 | 83 | 92 | 86 | 65 | 87 | 85 | 70 | 15 | 80 | 73 |
| After laundering | 70 | 75 | 70 | 81 | 90 | 83 | 60 | 83 | 80 | 64 | 15 | 75 | 67 |

| Treating composition | Ex. 15 | Ex. 16 | Ex. 17 | Ex. 18 | Untreated fabric |
|---|---|---|---|---|---|
| Water absorption (mm) | | | | | |
| Before laundering | 81 | 75 | 70 | 60 | 15 |
| After laundering | 78 | 65 | 63 | 58 | 15 |

EXAMPLE 22

The compositions obtained in Examples 2, 3, 5, 6, 8-11 and 13-18 each was diluted to a solid content of 10% with water containing an amount of EASTRON CATALYST-32 corresponding to 10% by weight of the solid content. Compositions of Examples 13-18 each was simply diluted to a solid content of 10%.

An undyed polyester jersey fabric was soaked in a bath of the above solution, expressed to a pickup of 100% using a mangle machine, dried at 100° C. for 3 minutes and heat-treated at 140° C. for one minute in a baking machine.

Each sample was tested for dyeability with reactive dyes.

Dyeing was carried out under the conditions below.

| Dyeing condition | |
|---|---|
| Bath composition: | |
| Anhydrous sodium sulfate | 30 g/l |
| Mikcacion Brilliant Red B (reactive dye, Mitsubishi Chemical Industries Ltd.) | 4% by weight of the fabric |
| Soda ash | 10% by weight of the fabric |
| Bath ratio: 1:50 | |
| Heating condition: 35° C. × 20 min. plus 85° C. × 60 min. | |
| Washing: Hot water | |

The state of dyeing was evaluated immediately after dyeing and after laundering under the conditions as specified in Example 19. The results are shown in Table IV. As can been seen in Table IV, fabrics treated with the compositions of this invention can be dyed with convnetional reactive dyes and the dyeing is persistent upon laundering.

TABLE IV

| Treating composition | Ex. 2 | Ex. 3 | Ex. 5 | Ex. 6 | Ex. 8 | Ex. 9 | Ex. 10 | Ex. 11 | Ex. 13 | Ex. 14 |
|---|---|---|---|---|---|---|---|---|---|---|
| State of dyeing | | | | | | | | | | |
| Before laundering | ◎ | ◎ | ◎ | ◎ | ◎ | ◎ | ◎ | ◎ | ◎ | ◎ |
| After laundering | ○-◎ | ○-◎ | ○-◎ | ○-◎ | ○-◎ | ○-◎ | ○-◎ | ○-◎ | ○-◎ | ○-◎ |

| Treating composition | Ex. 15 | Ex. 16 | Ex. 17 | Ex. 18 | Untreated fabric |
|---|---|---|---|---|---|
| State of dyeing | | | | | |
| Before laundering | ◎ | ◎ | ◎ | ◎ | X |
| After laundering | ○-◎ | ○-◎ | ○-◎ | ○-◎ | X |

Criteria for evaluation:
◎: Very good; ○: Good; X: Bad

EXAMPLE 23

Nylon tire cord was coated with one of the compositions obtained in Examples 2, 3, 5, 6 and 8-18 containing ELASTRON CATALYST-32 in an amount corresponding to 10% of the solid content (except for Examples 13-18) to a deposit amount of 2.0% on dry basis and then dried at 120° C. for 3 minutes. Then the cord was immersed in resorsinol-formaldehyde-latex (RFL) to a pickup of 3.0% on dry basis and heat-treated at 200° C. for 2 minutes.

The cord thus treated was embedded in a piece of natural rubber compound and the rubber piece was vulcanized at 150° C. for 30 minutes.

The rubber piece was tested for the peel strength and pulling out strength of the cord and flexural hardness of the rubber piece.

For comparison, a blank test was carried out on a corresponding sample prepared from the same nylon cord coated with RFL only at a pickup of 5% on dry basis.

The test results are shown in Table V as indexes relative to the values of blank test. As shown in Table V, the compositions of this invention are effective to improve adhesion strength of nylon tire cord to rubber.

TABLE V

| Treating composition | RFL only, brank | Ex. 2 | Ex. 3 | Ex. 5 | Ex. 6 | Ex. 8 | Ex. 9 | Ex. 10 | Ex. 11 | Ex. 12 |
|---|---|---|---|---|---|---|---|---|---|---|
| Peel strength | 100 | 110 | 130 | 120 | 135 | 120 | 123 | 135 | 124 | 140 |
| Pulling out strength | 100 | 101 | 106 | 105 | 102 | 104 | 101 | 104 | 112 | 115 |
| Flexural hardness | 100 | 100 | 100 | 95 | 98 | 95 | 98 | 112 | 98 | 99 |

| Treating composition | Ex. 13 | Ex. 14 | Ex. 15 | Ex. 16 | Ex. 17 | Ex. 18 |
|---|---|---|---|---|---|---|
| Peel strength | 110 | 120 | 130 | 124 | 120 | 110 |
| Pulling out strength | 101 | 105 | 112 | 110 | 105 | 104 |
| Flexural hardness | 101 | 85 | 98 | 99 | 88 | 101 |

EXAMPLE 24

A polyester jersey fabric was soaked in a bath of one of the solutions used in Example 19, expressed to a pickup of 110% (for compositions of Examples 1-11) or 100% (for compositions of Examples 13-18) using a mangle machine, dried at 120° C. for 2 minutes and heat-treated at 150° C. for 2 minutes.

The treated fabric was urged against a wood roller rotating at 1,500 rpm at a contact pressure of 1 kg. The linear speed at the roller surface was 7 m/minutes. The length of time until the fabric began to fuse by frictional heat was measured. The results are shown in Table VI.

TABLE VI

| Treating composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Friction fusing time (second) | 60 | 50 | 31 | 55 | 57 | 40 | 35 | 45 | 45 | 50 | 50 |

| Treating composition | Ex. 13 | Ex. 14 | Ex. 15 | Ex. 16 | Ex. 17 | Ex. 18 | Untreated fabric |
|---|---|---|---|---|---|---|---|
| Friction fusing time (second) | 46 | 30 | 50 | 42 | 38 | 30 | 2 |

EXAMPLE 25

Example 19 was repeated except that a nylon taffeta fabric was replaced for polyester jersey fabric and the soaked fabric was expressed to a pickup of 60%.

The treated fabric was tested for water absorption before and after laundering as in Example 19. The results are shown in Table VII.

TABLE VII

| Treating composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Water absorption (mm) | | | | | | | | | | | |
| Before laundering | 70 | 76 | 65 | 72 | 73 | 75 | 68 | 73 | 101 | 80 | 80 |
| After laundering | 63 | 73 | 55 | 60 | 67 | 63 | 59 | 68 | 97 | 75 | 73 |

| Treating composition | Ex. 13 | Ex. 14 | Ex. 15 | Ex. 16 | Ex. 17 | Ex. 18 | Untreated fabric |
|---|---|---|---|---|---|---|---|
| Water absorption (mm) | | | | | | | |
| Before laundering | 101 | 83 | 90 | 90 | 83 | 73 | 20 |
| After laundering | 93 | 73 | 85 | 87 | 79 | 68 | 20 |

We claim:

1. A composition for use in surface-treating synthetic or semi-synthetic fiber textile materials comprising an aqueous solution or dispersion of a thermally reactive saccharide/urethane ether having at least one blocked isocyanate group capable of regenerating free isocyanate function upon heating and at least one hydrophilic moiety, said saccharide component being selected from the group consisting of oligo- and polysaccharides, lower alkyl ethers thereof, hydroxy-lower alkyl ethers thereof, lower alkyl/hydroxy-lower alkyl ethers thereof and ionizable group-substituted lower alkyl ethers thereof, said saccharide/urethane ether being formed by etherifying said saccharide component with an etherifying agent having said blocked isocyanate group which is, in turn, a reaction product of a polyisocyanate compound with (a) a blocking agent and (b) a lower alkylene halohydrin or an adduct of epihalohydrin with a lower alkylene oxide.

2. The composition of claim 1, wherein said polyisocyanate compound is an organic polyisocyanate or a urethane prepolymer having a plurality of isocyanate groups.

3. The composition of claim 2, wherein said blocking agent is selected from the group consisting of secondary or tertiary alcohols, active methylene compounds, lactams, oximes, phenols, halophenols, heterocyclic hydroxyl compounds and alkali metal bisulfites.

4. The composition of claim 3, wherein a part of said plurality of isocyanate group of said polyisocyanate compound is blocked with said blocking agent other than the bisulfite blocking agent, the remainder of said isocyanate groups being blocked with said bisulfite blocking agent to introduce said hydrophilic moiety.

5. The composition of claim 3, wherein a part of said plurality of isocyanate groups of said polyisocyanate compound is blocked with said blocking agent other than the bisulfite blocking agent, the remainder of said isocyanate groups being reacted with a compound having an active hydrogen-donating group and an ionizable group to introduce said hydrophilic moiety.

6. The composition of claim 3, wherein a part of said plurality isocyanate groups of said polyisocyanate compound is blocked with said blocking agent other than said bisulfite blocking agent, the remainder of said isocyanate groups being reacted with a polyethylene glycol monoether or monoester to introduce said hydrophilic moiety.

7. The composition of claim 3, wherein said urethane prepolymer comprises a polyol component having a hydrophilic polyoxyethylene chain or an ionizable group.

8. A method for producing a hydrophilic, thermally reactive saccharide-urethane ether which comprises the steps of sequentially reacting a polyisocyanate compound with an isocyanate-blocking agent and a member of the group consisting of a lower alkylene halohydrin and an adduct of epihalohydrin with a lower alkylene oxide to produce an etherifying agent having at least one halogen-terminated urethane group and at least one blocked isocyanato group, the sum of the number of said halogen-terminated urethane groups and said blocked isocyanato group per molecule of said etherifying agent being equal to the number of isocyanato groups of said polyisocyanate compound; and then reacting said etherifying agent with a saccharide compound selected from the group consisting of oligo- and polysaccharides, hydroxy-lower alkyl ethers thereof, lower alkyl hydroxy-lower alkyl ethers thereof and ionizable group-substituted hydroxy-lower alkyl ethers thereof in an aqueous solution of a base to produce an aqueous solution or dispersion of said saccharide-urethane ether.

9. The method of claim 8, wherein said polyisocyanate compound is an organic polyisocyanate or a urethane prepolymer having a plurality of isocyanate groups.

10. The method of claim 9, wherein said blocking agent is selected from the group consisting of secondary or tertiary alcohols, active methylene compounds, lactams, oximes, phenols, halophenols, heterocyclic hydroxyl compounds, and alkali metal bisulfites.

11. The method of claim 10, wherein a part of said plurality of isocyanate groups of said polyisocyanate compound is blocked with said blocking agent other than the bisulfite blocking agent, the remainder of said isocyanate groups being blocked with said bisulfite blocking agent to provide a hydrophilic moiety.

12. The method of claim 10, wherein a part of said plurality of isocyanate groups of said polyisocyanate compound is blocked with said blocking agent other than the bisulfite blocking agent, the remainder of said isocyanate groups being reacted with a compound having an active hydrogen-donating group and an ionizable group to provide a hydrophilic moiety.

13. The method of claim 10, wherein a part of said plurality of isocyanate groups of said polyisocyanate compound is blocked with said blocking agent other than said bisulfite blocking agent, the remainder of said isocyanate groups being reacted with a polyethylene glycol monoether or monoester to provide a hydrophilic moiety.

14. The method of claim 10, wherein said polyisocyanate compound is a urethane prepolymer which comprises a polyol component having a hydrophilic polyoxyethylene chain or an ionizable group.

* * * * *

UNITED STATES PATENT AND TRADEMARK OFFICE
CERTIFICATE OF CORRECTION

PATENT NO. : 4,931,524

DATED : June 5, 1990

INVENTOR(S) : KAZUO SATO ET AL

It is certified that error appears in the above-identified patent and that said Letters Patent is hereby corrected as shown below:

Title page, field [30], Foreign Application Priority Data:

should read as follows "
| | | |
|---|---|---|
| JAPAN | 33615/1986 | 2/17/1986 |
| JAPAN | 33616/1986 | 2/17/1986 |
| JAPAN | 42645/1986 | 2/26/1986 |
| JAPAN | 42646/1986 | 2/26/1986 " |

Signed and Sealed this

Seventeenth Day of September, 1991

*Attest:*

HARRY F. MANBECK, JR.

*Attesting Officer*      *Commissioner of Patents and Trademarks*